UNITED STATES PATENT OFFICE.

ISAAC ATKINSON, OF HAMILTON, CANADA.

IMPROVEMENT IN PRESERVING MEATS, BACON, &c.

Specification forming part of Letters Patent No. 149,631, dated April 14, 1874; application filed March 5, 1874.

*To all whom it may concern:*

Be it known that I, ISAAC ATKINSON, of the city of Hamilton, in the county of Wentworth in the Province of Ontario, Dominion of Canada, have invented a certain new and useful Improvement in Curing and Packing Meats, of which the following is a specification:

This invention is intended to improve upon the mode of curing and packing meats patented by me on the 21st day of January, 1873, and reissued on the 13th day of May, 1873, No. 5,410; the object of the present invention being to extract all moisture from the meat, such as shoulders, hams, sides, &c., after the same have been treated substantially in the manner described in the foregoing Letters Patent, and prior to the wrapping or separating the same by paper, strawboard, or textile material, for the purpose of packing for transportation.

In carrying out my present invention, the shoulders, hams, sides, &c., of hogs, after killing and suspension in the cooling-room, are placed, piece upon piece, in layers, with ice and salt between each layer, and permitted so to remain for about, say, twenty-four hours, after which they are removed and pickled, when they are again removed, laid in rows, and sprinkled with saltpeter, and well covered with salt. After such treatment they are removed, and in about, say, seven days, again salted; and in about, say, seven days, are again removed and resalted, remaining in this last condition for about, say, sixteen days, when they are sufficiently cured.

To prepare said meat, thus cured, for packing, the same was well brushed in water, weighed, and the moisture wiped off with a cloth. It was then sprinkled or rubbed with alum.

The meat, thus prepared, as in my aforesaid Letters Patent, was prepared for packing in paper, paper-board, or textile material.

I have now discovered that meat treated for packing as above described contains a high degree of moisture throughout its body, which, remaining therein, and thus packed, is the principal cause of its deterioration, the moisture exuding from the meat, when packed in boxes, bales, or casks, engendering a slime, which soon results in the formation of maggots and other foreign insects. Therefore, in view of simply wiping the surface of the meat to remove the moisture present thereon after salting, and prior to sprinkling or rubbing the same with alum, or similar suitable substance, I place a number of pieces of the cured meat in a frame capable of holding five hundred pounds, more or less, placing between each piece of meat a piece of dry sackcloth, cotton, or other textile material of an absorbent nature. The meat is then subjected to a high pressure, by means of a suitable press or other machine, so that the moisture throughout the body of the meat is forced upon its surface, and absorbed by the sackcloth, cotton, or other suitable material found suitable for the purpose.

Different pressures may be exerted upon the meat from time to time while in the press; and as the moisture rises or moves to the surface the same will be rapidly absorbed by the absorbent material surrounding the same.

In lieu of a textile material as an absorbent the meat will, in some instances, be subjected to blasts or currents of air while in the press.

What I claim as my invention, and desire to secure by Letters Patent, is—

The mode, substantially as described, of treating meat for packing, the same consisting in removing the moisture remaining in the meat after curing and washing by subjecting the meat to compression, preparatory to packing, as specified.

Dated at Hamilton, Canada, this 23d day of February, 1874.

ISAAC ATKINSON.

Witnesses:
JAMES OSBORNE,
JOHN J. OSBORNE.